United States Patent
Li

(10) Patent No.: US 12,034,568 B2
(45) Date of Patent: *Jul. 9, 2024

(54) DATA TRANSMISSION METHOD, DEVICE, AND NETWORK SYSTEM

(71) Applicant: HUAWEI TECHNOLOGIES CO., LTD., Shenzhen (CN)

(72) Inventor: Jiuyong Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/980,631

(22) Filed: Nov. 4, 2022

(65) Prior Publication Data

US 2023/0073291 A1    Mar. 9, 2023

Related U.S. Application Data

(63) Continuation of application No. 16/924,734, filed on Jul. 9, 2020, now Pat. No. 11,539,551, which is a (Continued)

(30) Foreign Application Priority Data

Jan. 11, 2018   (CN) .......................... 201810026227.1

(51) Int. Cl.
*H04L 12/46*    (2006.01)
*H04W 60/00*    (2009.01)
*H04W 88/14*    (2009.01)

(52) U.S. Cl.
CPC ...... *H04L 12/4633* (2013.01); *H04L 12/4679* (2013.01); *H04W 60/005* (2013.01); *H04W 88/14* (2013.01)

(58) Field of Classification Search
CPC .......... H04L 12/4633; H04L 12/4679; H04W 60/005; H04W 88/14
See application file for complete search history.

(56) References Cited

U.S. PATENT DOCUMENTS

| | | | | |
|---|---|---|---|---|
| 10,142,129 B1 * | 11/2018 | Gupta | ...................... | H04L 45/66 |
| 11,539,551 B2 * | 12/2022 | Li | ........................ | H04L 12/4679 |

(Continued)

FOREIGN PATENT DOCUMENTS

| | | |
|---|---|---|
| CN | 103957160 A | 7/2014 |
| CN | 105634942 A | 6/2016 |

(Continued)

*Primary Examiner* — Luat Phung
(74) *Attorney, Agent, or Firm* — Rimon PC

(57) ABSTRACT

This application provides a data transmission method, a device, and a network system. The method is applied to a backbone device, and the backbone device is connected to at least two access devices. After obtaining first data that needs to be sent to a first user device, the backbone device determines a first tunnel interface identifier corresponding to the first user device. The first user device is a single-homing user device. The backbone device sends, based on the first tunnel interface identifier, a first data packet including the first data to a first access device of the at least two access devices. The first access device is configured with the first tunnel interface identifier. This can optimize a data forwarding path, implement traffic optimization for the single-homing user device, and reduce traffic pressure on the network system.

21 Claims, 7 Drawing Sheets

400

A backbone device obtains first data that needs to be sent to a first user device, and determines, based on a first mapping table stored on the backbone device, a first tunnel interface identifier corresponding to the first user device, where the first user device is a single-homing user device — S410

The backbone device sends, based on the first tunnel interface identifier, a first data packet including the first data to a first access device, where the first access device is an access device configured with the first tunnel interface identifier — S420

The backbone device spine sends, based on the first tunnel interface identifier by using the VXLAN, the first data packet including the first data to the first access device — S430

Related U.S. Application Data continuation of application No. PCT/CN2019/070789, filed on Jan. 8, 2019.

(56) References Cited

U.S. PATENT DOCUMENTS

| | | | |
|---|---|---|---|
| 2015/0200847 A1* | 7/2015 | Gourlay | H04L 63/10 370/392 |
| 2016/0164805 A1 | 6/2016 | Ju | |
| 2017/0257309 A1 | 9/2017 | Appanna | |
| 2018/0123827 A1* | 5/2018 | Josyula | H04L 12/4633 |
| 2018/0351855 A1* | 12/2018 | Sood | H04L 45/28 |
| 2019/0013965 A1* | 1/2019 | Sindhu | G06F 12/0817 |
| 2019/0132241 A1* | 5/2019 | Vattem | H04L 12/4633 |
| 2023/0073291 A1* | 3/2023 | Li | H04L 12/4679 |

FOREIGN PATENT DOCUMENTS

| | | |
|---|---|---|
| CN | 106936939 A | 7/2017 |
| CN | 106998286 A | 8/2017 |
| CN | 107135118 A | 9/2017 |
| CN | 107409102 A | 11/2017 |
| CN | 107547366 A | 1/2018 |
| CN | 107547402 A | 1/2018 |

* cited by examiner

400

S410: A backbone device obtains first data that needs to be sent to a first user device, and determines, based on a first mapping table stored on the backbone device, a first tunnel interface identifier corresponding to the first user device, where the first user device is a single-homing user device S420: The backbone device sends, based on the first tunnel interface identifier, a first data packet including the first data to a first access device, where the first access device is an access device configured with the first tunnel interface identifier S430: The backbone device spine sends, based on the first tunnel interface identifier by using the VXLAN, the first data packet including the first data to the first access device

A first access device receives, by using a first single-homing tunnel interface, a first data packet including first data, where the first data is destined for a first user device, the first single-homing tunnel interface is a single-homing tunnel interface indicated by a first tunnel interface identifier, the first tunnel interface identifier is a tunnel interface identifier corresponding to the first user device, and the first user device is a single-homing user device connected to the first access device ~ S510

The first access device processes the first data packet to obtain the first data ~ S520

The first access device sends the first data to the first user device ~ S530

FIG. 5

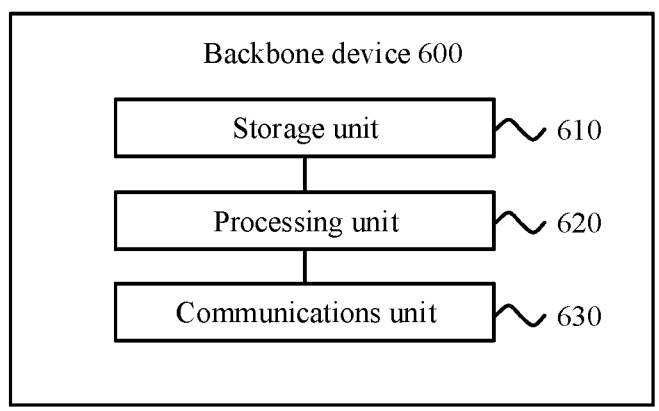

FIG. 6

DATA TRANSMISSION METHOD, DEVICE, AND NETWORK SYSTEM

CROSS-REFERENCE TO RELATED APPLICATIONS

This application is a continuation of U.S. patent application Ser. No. 16/924,734 filed on Jul. 9, 2020. This application is a continuation of International Application No. PCT/CN2019/070789, filed on Jan. 8, 2019, which claims priority to Chinese Patent Application No. 201810026227.1, filed on Jan. 11, 2018. All of the aforementioned applications are hereby incorporated by reference in their entireties.

TECHNICAL FIELD

This application relates to the communications field, and more specifically, to a data transmission method, a device, and a network system.

BACKGROUND

A virtual extensible local area network (VXLAN) is used to meet a requirement of a virtual machine in a multi-tenant environment for a layer-2 data center network infrastructure and a layer-3 data center network infrastructure. The VXLAN runs over an existing network infrastructure and provides a manner to extend a layer-2 network. In short, the VXLAN is a solution in which the layer-2 network is overlaid on a layer-3 network. Each overlay network is referred to as a VXLAN network segment. Only virtual machines (VM) in a same VXLAN network segment can communicate with each other. Each VXLAN network segment is identified by a 24-bit network segment identifier. The network segment identifier is referred to as a VXLAN network identifier (VNI). In this way, there may be a maximum of 16M VXLAN network segments in a management domain.

The VNI is used to identify a range of an inner MAC frame initiated by the VM. Therefore, there may be overlapping MAC addresses in the VXLAN network segment, but there is no intersecting traffic. Therefore, the traffic is isolated by using the VNI. The VNI is in an outer header that is used to encapsulate the inner MAC frame initiated by the virtual machine.

Because of this encapsulation, the VXLAN may also be referred to as a solution in which a tunnel of the layer-2 network is overlaid on the layer-3 network. The tunnel is stateless, and therefore each frame is encapsulated according to a series of rules. A VXLAN tunnel end point (VTEP) is located on a hypervisor of a server on which the virtual machine is located. Therefore, the VTEP knows the VNI and the VXLAN tunnel/outer encapsulation, but the VM never knows. It should be noted that the VTEP may alternatively be on a physical switch or a physical server, and may be implemented by using software or hardware.

SUMMARY

This application provides a data transmission method, a device, and a network system, to implement traffic optimization for a single-homing user device and reduce traffic pressure of the network system. The application is defined by the attached claims.

According to a first aspect, a data transmission method is provided, and the method is applied to a backbone device. The backbone device is connected to at least two access devices. The at least two access devices form a multi-chassis link aggregation group to connect to a multi-homing user device, and at least one of the at least two access devices is further configured to connect to a single-homing user device. Each access device connecting to a single-homing user device has at least one single-homing interface, and the single-homing tunnel interface is used to only transmit data that needs to be sent to a single-homing user device connected to the access device. The backbone device stores a first mapping table, and the first mapping table is used to indicate a tunnel interface identifier corresponding to each of a plurality of single-homing user devices. The tunnel interface identifier corresponding to one single-homing user device is an identifier of a single-homing tunnel interface of an access device connected to the single-homing user device. The method includes: after obtaining first data that needs to be sent to a first user device, determining, by the backbone device based on the first mapping table, a first tunnel interface identifier corresponding to the first user device, where the first user device is the single-homing user device; and sending, by the backbone device based on the first tunnel interface identifier, a first data packet including the first data to a first access device, where the first access device is an access device configured with the first tunnel interface identifier.

In the foregoing technical solution, at least one single-homing tunnel interface that is used to only transmit the data that needs to be sent to the single-homing user device is disposed on the access device connected to the single-homing user device, to implement traffic optimization. In this way, data destined for the single-homing user device does not detour between a plurality of access devices, increasing traffic pressure. In this embodiment, a packet is encapsulated based on a different type of a port that is on an access device and that corresponds to a user device, so that packets destined for different types of user devices have different outer source IP addresses. In this way, a single-homing tunnel interface can be accurately selected from different VXLAN tunnels to forward data, so that the data is directly forwarded to the single-homing user device without passing through a peer-link. This reduces bandwidth pressure of the peer-link and optimizes a forwarding path of the single-homing user device.

With reference to the first aspect, in a first implementation of the first aspect, the backbone device and each of the at least two access devices support a virtual extensible local area network VXLAN function. The sending, by the backbone device based on the first tunnel interface identifier, a first data packet including the first data to a first access device includes: generating, by the backbone device, the first data packet, where the first data packet includes a VXLAN tunnel header, and an outer source address field of the VXLAN tunnel header includes the first tunnel interface identifier; and sending, by the backbone device, the first data packet to the first access device through a VXLAN tunnel corresponding to the first tunnel interface identifier.

When the multi-chassis link aggregation group M-LAG accesses a virtual extensible local area network VXLAN, traffic optimization is implemented by using the foregoing technical solution, so that main traffic in the VXLAN, namely, unicast traffic destined for the single-homing user device, is not forwarded through the horizontal link peer-link between a plurality of member devices, namely, access devices, of the M-LAG. This reduces the bandwidth pressure of the peer-link and optimizes the forwarding path of the single-homing user device.

With reference to the first aspect and the implementation of the first aspect, in a second implementation of the first aspect, the first mapping table is specifically used to indicate a mapping relationship between an identifier of each of the plurality of single-homing user devices and a tunnel interface identifier corresponding to the single-homing user device. The determining, by the backbone device based on the first mapping table, a first tunnel interface identifier corresponding to the first user device includes: determining, by the backbone device based on the first mapping table, a tunnel interface identifier corresponding to a first device identifier as the first tunnel interface identifier, where the first device identifier is used to indicate the first user device.

In the foregoing technical solution, the first mapping table is defined to indicate the mapping relationship between a device identifier and a tunnel interface identifier. Different device identifiers of user devices are mapped to different tunnel interface identifiers, so that the backbone device accurately selects a single-homing tunnel interface of an access device, to accurately forward, by using the single-homing tunnel interface, a unicast packet destined for the single-homing user device to the access device. This implements optimal forwarding of unicast traffic on a single-homing port.

With reference to the first aspect and the implementations of the first aspect, in a third implementation of the first aspect, the first data is data carried in a second data packet received by the backbone device, and the second data packet includes the first device identifier.

The packet received by the backbone device may be a unicast packet, a broadcast packet, a multicast packet, an unknown unicast packet (namely, the second data packet), or the like. In this case, the first data may be the data that needs to be sent to the single-homing user device, and is the data carried in the second data packet. The second data packet includes an identifier of the single-homing user device. In this case, a forwarding path of the unicast packet destined for the single-homing user device is limited, so that the data can be directly forwarded to the single-homing user device without passing through the horizontal link peer-link between the access devices. This reduces the bandwidth pressure of the peer-link and optimizes the forwarding path of the single-homing user device.

With reference to the first aspect and the implementations of the first aspect, in a fourth implementation of the first aspect, the backbone device obtains the first data in a unicast manner.

In the prior art, different types of data sent to the single-homing user device and a dual-homing user device is forwarded by using one tunnel interface. If a packet destined for the single-homing user device is sent to an access device that is not connected to the single-homing user device, the access device needs to send, through the horizontal link peer-link between the access devices, the packet to the access device connected to the single-homing user device. Therefore, this causes great traffic pressure on the horizontal link peer-link. In this embodiment of this application, the unicast traffic destined for the single-homing user device is distinguished from another traffic path. At least one single-homing tunnel interface that is used to only transmit the data that needs to be sent to the single-homing user device is disposed on the access device connected to the single-homing user device. In this way, the unicast traffic is forwarded, by using the single-homing tunnel interface, to the access device connected to the single-homing user device, to implement traffic optimization for the single-homing user device, so that the unicast traffic destined for the single-homing user device is not forwarded through the horizontal link peer-link between the plurality of member devices, namely, the access devices, of the M-LAG. This reduces the bandwidth pressure of the peer-link.

According to a second aspect, a data transmission method is provided, and the method is applied to a first access device. The first access device and a second access device form a multi-chassis link aggregation group to connect to a multi-homing user device, and the first access device is further configured to connect to a single-homing user device. The first access device has a single-homing tunnel interface, and the single-homing tunnel interface is used to only transmit data that needs to be sent to a single-homing user device connected to the first access device. The method includes: receiving, by the first access device by using the first single-homing tunnel interface, a first data packet including first data, where the first data is destined for a first user device, the first single-homing tunnel interface is a single-homing tunnel interface indicated by a first tunnel interface identifier, the first tunnel interface identifier is a tunnel interface identifier corresponding to the first user device, and the first user device is the single-homing user device connected to the first access device; processing, by the first access device, the first data packet to obtain the first data; and sending, by the first access device, the first data to the first user device.

With reference to the second aspect, in a first implementation of the second aspect, the first access device and the second access device support a virtual extensible local area network VXLAN function. The receiving, by the first access device by using the first single-homing tunnel interface, a first data packet including first data includes: receiving, by the first access device, the first data packet through a VXLAN tunnel corresponding to the first single-homing tunnel interface, where the first data packet includes a VXLAN tunnel header, and an outer source address field of the VXLAN tunnel header includes the first tunnel interface identifier.

With reference to the second aspect and the implementation of the second aspect, in a second implementation of the second aspect, the first access device and the second access device have a common dual-homing tunnel interface. The dual-homing tunnel interface is used to transmit data that needs to be sent to a dual-homing user device; and/or the dual-homing tunnel interface is used to transmit broadcast data; and/or the dual-homing tunnel interface is used to transmit data that needs to be sent to a single-homing user device that is not connected to the access device.

In the foregoing technical solution, an original tunnel interface (namely, the dual-homing tunnel interface) of the access device is used to transmit at least one of the data that needs to be sent to the dual-homing user device, the broadcast data, and the data that needs to be sent to the single-homing user device that is not connected to the access device. This implements path separation and reduces bandwidth pressure.

According to a third aspect, a backbone device is provided. The backbone device is configured to connect to at least two access devices, and the at least two access devices form a multi-chassis link aggregation group to connect to a multi-homing user device. At least one of the at least two access devices is further configured to connect to a single-homing user device. each access device connecting to a single-homing user device has at least one single-homing interface, and the single-homing tunnel interface is used to only transmit data that needs to be sent to a single-homing user device connected to the access device. The backbone device includes: a storage unit, configured to store a first mapping table, where the first mapping table is used to indicate a tunnel interface identifier corresponding to each of a plurality of single-homing user devices, and the tunnel interface identifier corresponding to one single-homing user device is an identifier of a single-homing tunnel interface of an access device connected to the single-homing user device; a processing unit, configured to: after obtaining first data that needs to be sent to a first user device, determine, based on the first mapping table, a first tunnel interface identifier corresponding to the first user device, where the first user device is the single-homing user device; and a communications unit, configured to: send, based on the first tunnel interface identifier, a first data packet including the first data to a first access device, where the first access device is an access device configured with a single-homing tunnel interface indicated by the first tunnel interface identifier.

With reference to the third aspect, in a first implementation of the third aspect, the backbone device and each of the at least two access devices support a virtual extensible local area network VXLAN function. The processing unit is specifically configured to generate the first data packet. The first data packet includes a VXLAN tunnel header, and an outer source address field of the VXLAN tunnel header includes the first tunnel interface identifier. The communications unit is specifically configured to send the first data packet to the first access device through a VXLAN tunnel corresponding to the first tunnel interface identifier.

With reference to the third aspect and the implementation of the third aspect, in a second implementation of the third aspect, the first mapping table is specifically used to indicate a mapping relationship between an identifier of each of the plurality of single-homing user devices and a tunnel interface identifier corresponding to the single-homing user device. The processing unit is specifically configured to determine, based on the first mapping table, a tunnel interface identifier corresponding to a first device identifier as the first tunnel interface identifier. The first device identifier is used to indicate the first user device.

With reference to the third aspect and the implementations of the third aspect, in a third implementation of the third aspect, the first data is data carried in a second data packet received by the backbone device, and the second data packet includes the first device identifier.

With reference to the third aspect and the implementations of the third aspect, in a fourth implementation of the third aspect, the backbone device obtains the first data in a unicast manner.

According to a fourth aspect, an access device is provided, and the access device is a first access device. The first access device and a second access device form a multi-chassis link aggregation group to connect to a multi-homing user device, and the first access device is further configured to connect to a single-homing user device. the first access device has a single-homing tunnel interface, and the single-homing tunnel interface is used to only transmit data that needs to be sent to a single-homing user device connected to the first access device. The first access device includes: a first communications unit, configured to: receive, by using the first single-homing tunnel interface, a first data packet including first data, where the first data is destined for a first user device, the first single-homing tunnel interface is a single-homing tunnel interface indicated by a first tunnel interface identifier, the first tunnel interface identifier is a tunnel interface identifier corresponding to the first user device, and the first user device is the single-homing user device connected to the first access device; a processing unit, configured to process the first data packet to obtain the first data; and a second communications unit, configured to send the first data to the first user device.

With reference to the fourth aspect, in a first implementation of the fourth aspect, the first access device and the second access device support a virtual extensible local area network VXLAN function. The communications unit is specifically configured to receive the first data packet by using the first single-homing tunnel interface. The first data packet includes a VXLAN tunnel header, and an outer source address field of the VXLAN tunnel header includes the first tunnel interface identifier.

With reference to the fourth aspect and the implementation of the fourth aspect, in a second implementation of the fourth aspect, each access device connected to a dual-homing user device is configured with at least one dual-homing port. The dual-homing port is used to transmit data that needs to be sent to the dual-homing user device; and/or the dual-homing port is used to transmit broadcast data; and/or the dual-homing port is used to transmit data that needs to be sent to a single-homing user device that is not connected to the first access device.

When the multi-chassis link aggregation group M-LAG accesses a virtual extensible local area network VXLAN, at least one single-homing port that is used to only transmit the data that needs to be sent to the single-homing user device is disposed on the access device connected to the single-homing user device, to implement optimal forwarding of unicast traffic destined for the single-homing user device, so that main traffic in the VXLAN, namely, the unicast traffic destined for the single-homing user device, is not forwarded through a horizontal link peer-link between a plurality of member devices, namely, access devices, of the M-LAG. A packet is encapsulated based on a port type, so that the packet has different source IP addresses. In this way, a single-homing tunnel interface can be accurately selected from different VXLAN tunnels to forward data, so that the data is directly forwarded to the single-homing user device without passing through the peer-link. This reduces bandwidth pressure of the peer-link and optimizes a forwarding path of the single-homing port.

According to a fifth aspect, a data transmission device is provided. The device may be the data transmission apparatus in the foregoing method design, or may be a chip configured in the data transmission apparatus. The device includes a processor, a memory, a communications interface, and a bus. The processor, the memory, and the communications interface communicate with each other by using the bus. The memory stores program code, and the processor may invoke the program code stored in the memory to perform the data transmission method in the first aspect, the second aspect, any possible implementation of the first aspect, or any possible implementation of the second aspect.

According to a sixth aspect, a network system is provided, including at least one user device, the backbone device according to any implementation of the third aspect, and at least two access devices according to any implementation of the fourth aspect. The backbone device is configured to connect to the at least two access devices, and the at least two access devices form a multi-chassis link aggregation group to connect to a multi-homing user device. At least one of the at least two access devices is further configured to connect to a single-homing user device. Each access device connecting to a single-homing user device has at least one single-homing interface, and the single-homing tunnel interface is used to only transmit data that needs to be sent to a single-homing user device connected to the access device.

According to a seventh aspect, a computer-readable storage medium is provided, configured to store a computer instruction. When the computer instruction is run on a computer, the computer is enabled to perform the data transmission method in the first aspect, the second aspect, any possible implementation of the first aspect, or any possible implementation of the second aspect.

According to an eighth aspect, a computer program product is provided. The computer program product includes computer program code. When the computer program code is run on a computer, the computer is enabled to perform the data transmission method in the first aspect, the second aspect, any possible implementation of the first aspect, or any possible implementation of the second aspect.

For beneficial effects of the second aspect to the eighth aspect and the implementations of the second aspect to the eighth aspect, refer to beneficial effects of the method in the first aspect and the implementations of the first aspect.

BRIEF DESCRIPTION OF DRAWINGS

FIG. 4 is a schematic flowchart of a data transmission method according to an embodiment of this application;

FIG. 5 is another schematic flowchart of a data transmission method according to an embodiment of this application;

FIG. 6 is a schematic block diagram of a backbone device according to an embodiment of this application;

DESCRIPTION OF EMBODIMENTS

Figure 1:
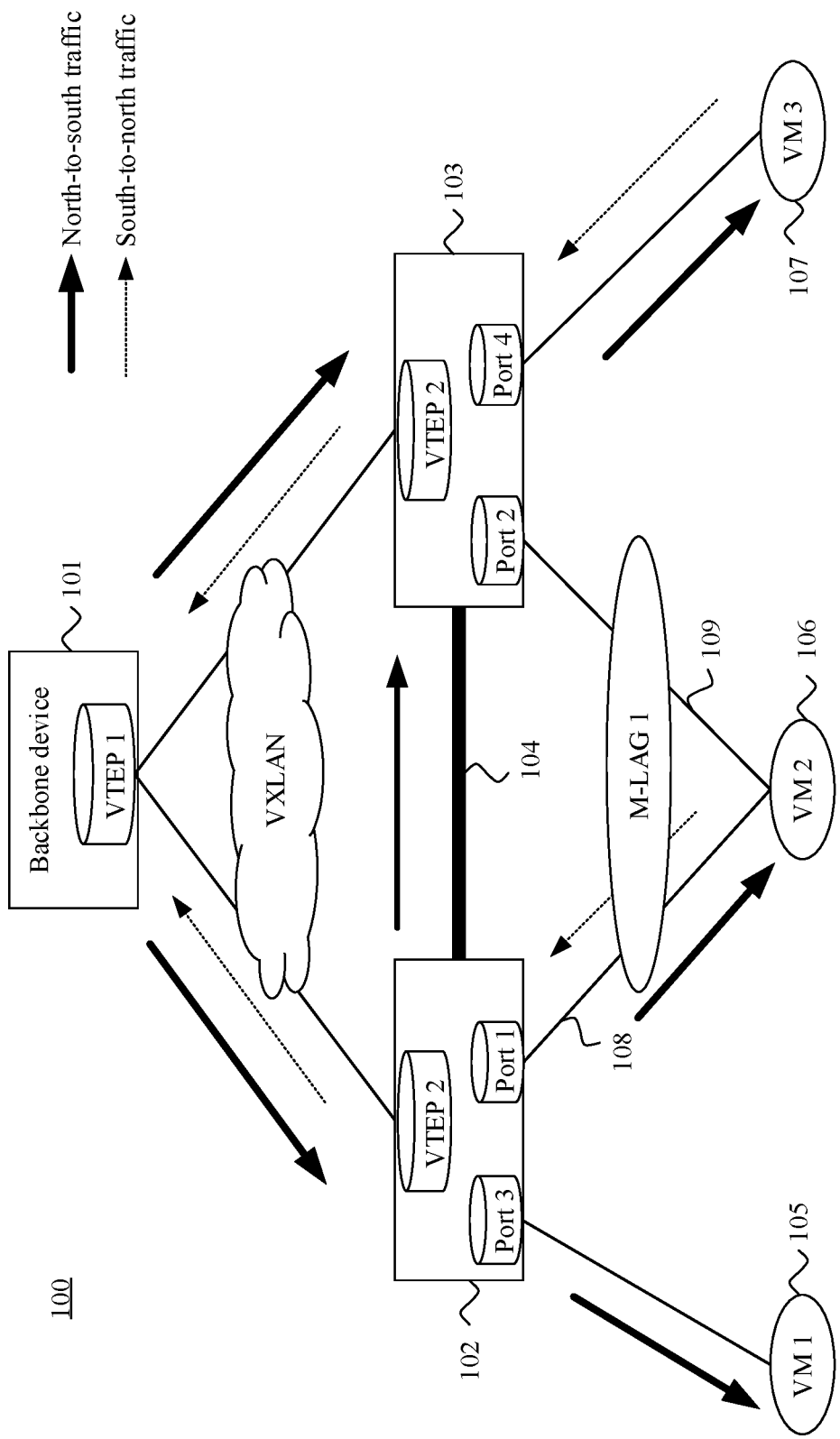
FIG. 1 is a schematic diagram of a network system in which an M-LAG accesses a VXLAN according to an embodiment of this application.

For ease of understanding the solution, some concepts in the embodiments of this application are first briefly described.

Unicast means that information is transmitted and received only between two nodes. Communication between network nodes is like a conversation between people. If a person speaks to another person, the term "unicast" in the network technology is used for description. The unicast is widely used on a network. Most data on the network is transmitted in a unicast manner, which is unknown to a common network user. For example, when an email is sent and received or a web page is browsed, a connection to an email server and a connection to a web server need to be established. In this case, data is transmitted in a unicast manner. However, because the "unicast" is usually used together with "multicast" and "broadcast", "point-to-point (Point to Point) communication" is usually used to replace the "unicast".

Multicast, also referred to as "group communication", is not widely used in the network technology. A multicast manner is very suitable for a video conference and a video on demand on the internet. If the unicast manner is used, transmission is performed node by node, and a quantity of transmission processes depends on a quantity of destination nodes. This manner is inefficient and is not desirable. If a broadcast manner according to which a destination is not distinguished and all data is sent is used, although the data may be transmitted at a time, a specific object for receiving data is certainly not distinguished. By using the multicast manner, data of all destination nodes may be transmitted at a time, and data to a specific object may also be transmitted. Nodes during the multicast that communicate with each other need to be added to a same multicast group. Multicast on an IP network is implemented by using a multicast IP address. The multicast IP address is a class D IP address, namely, an IP address ranging from 224.0.0.0 to 239.255.255.255.

Broadcast is widely used on the network. For example, a process in which a client automatically obtains an IP address by using a dynamic host configuration protocol (DHCP) is implemented in the broadcast manner. Compared with the unicast and the multicast, the broadcast occupies almost all bandwidth of a subnet. For example, at a conference, only one participant can speak. If all participants use microphones to speak at the same time, the conference is in a mess. A hub cannot filter a broadcast storm because of a working principle of the hub, and a common switch does not have this function. However, an existing network switch (for example, an omnidirectional QS series switch) also has the function of filtering the broadcast storm, and a router can isolate the broadcast storm. The broadcast storm cannot be completely prevented, but can be transmitted only in a same subnet, which is similar to that a sound of the microphone can be transmitted only in a same conference site. Therefore, in a medium or large local area network including hundreds or even thousands of computers, subnet division is usually performed, which is similar to that a hall is divided into many small halls by using walls, to isolate the broadcast storm. In the IP network, a broadcast address is represented by an IP address "255.255.255.255", and the IP address represents all IP addresses in a same subnet.

A BUM packet includes a broadcast packet, a multicast packet, and an unknown unicast packet.

The following describes the technical solutions of this application with reference to the accompanying drawings.

The following describes an embodiment of this application in detail by using a network system in which multi-chassis link aggregation group (M-LAG) accesses a virtual extensible local area network VXLAN as an example. FIG. 1 is a schematic diagram of a network system 100 in which an M-LAG accesses a VXLAN according to this application.

The VXLAN in this application is a typical layer-2 network architecture. The VXLAN includes a backbone layer and an access layer. The backbone layer includes at least one backbone device, for example, a backbone node (spine). The access layer includes a plurality of access devices, for example, a leaf node (leaf). A service gateway is usually deployed at the backbone layer, and at least one leaf node is disposed at the access layer. A user device accesses the VXLAN by using the leaf node. As shown in FIG. 1, in this application, the backbone layer includes a backbone node spine 101. The access layer includes two leaf nodes: a leaf 102 and a leaf 103. The spine 101 communicates with the leaf 102 and the leaf 103 that are at the access layer by establishing a routing protocol. The spine 101 may be directly connected to the leaf 102 and the leaf 103, or a communication connection may be established by using another routing device, to complete tunnel establishment and host route synchronization. User devices VM 1, VM 2, and VM 3 respectively represented by 105, 106, and 107 access the VXLAN by using the leaf 102 and/or the leaf 103.

To ensure reliable access of the user devices, the user devices may be connected to different leaf nodes by using a plurality of different links. The plurality of links form the M-LAG. Each of the plurality of links is referred to as a member link of the M-LAG, and a device corresponding to each of the plurality of links is referred to as a member device of the M-LAG. Each link has a corresponding port on a corresponding leaf node, and ports that correspond to the plurality of links and that are on the different leaf nodes are referred to as member ports of the M-LAG. The plurality of links in the M-LAG are used to perform load sharing on traffic corresponding to the user device, and serve as backup links for each other. For example, in FIG. 1, the VM 2 is connected to the leaf 102 by using a link 1 represented by 108, and is connected to the leaf 103 by using a link 2 represented by 109. The link 1 and the link 2 form an M-LAG 1. A port 1, as a member port of the M-LAG 1, is located on the leaf 102, and a port 2, as a member port of the M-LAG 1, is located on the leaf 103. The leaf 102 and the leaf 103 are member devices of the M-LAG 1, and the link 1 and the link 2 are member links of the M-LAG 1. The link 1 and the link 2 are used to implement load sharing of traffic of the VM 2, and serve as backup links for each other.

An M-LAG technology can implement link aggregation of a plurality of devices. This improves link reliability from a board level to a device level. There needs to be a direct link between two devices that are deployed in the M-LAG. The link needs be configured as a horizontal link peer-link. The peer-link is a layer-2 link that is used to exchange a negotiation packet and transmit some traffic. After an interface on the leaf node is configured as a peer-link interface, another service cannot be configured on the interface.

When a user device is connected to only one access device, the user device is referred to as a single-homing user device, and a port that is of the access device and that is used to connect to the single-homing user device is a single-homing port. For example, the VM 1 and the VM 3 in the network system 100 are single-homing user devices, a port 3 is a single-homing port of the leaf 102, and a port 4 is a single-homing port of the leaf 103. When a user device is connected to two access devices, the user device is referred to as a dual-homing user device, and a port that is of the access device and that is connected to the dual-homing user device is a dual-homing port. For example, the VM 2 in the network system 100 is the dual-homing user device, the port 1 is a dual-homing port of the leaf 102, and the port 2 is a dual-homing port of the leaf 103. The user device may further be connected to more than three access devices. In this application, the dual-homing user device and the user device connected to more than three access devices are collectively referred to as a multi-homing access device.

In the network system in which the M-LAG accesses the VXLAN, a tunnel interface is a tunnel endpoint VTEP. VTEPs are deployed on the spine and the leaf. Each VTEP has a corresponding tunnel interface identifier, and the tunnel interface identifier may be an IP address. The tunnel interface identifier is used to indicate a tunnel interface of a tunnel established between the spine and the leaf. For example, a tunnel interface identifier corresponding to one single-homing user device is used to indicate a single-homing tunnel interface of an access device connected to the single-homing user device. The single-homing tunnel interface is a tunnel egress interface that is disposed in the access device connected to the single-homing user device and that is used to only transmit data that needs to be sent to a single-homing user device.

In FIG. 1, a VTEP of the spine 101 is a VTEP 1, and an IP address of the VTEP 1 is an IP 1. A VTEP of the leaf 102 or the leaf 103 is a VTEP 2, and an IP address of the VTEP 2 is an IP 2. In this application, the VTEP shown in the accompanying drawings is a logical tunnel egress interface. For ease of understanding, the VTEP is shown in the accompanying drawings. After a packet is encapsulated by using the VTEP, a VXLAN packet is obtained. In the VXLAN packet, an outer source IP address is a local VTEP address, and an outer destination IP address is a peer VTEP address. A pair of VTEP addresses correspond to a VXLAN tunnel.

A plurality of member devices of the M-LAG are presented as one device to an upper-layer device. In other words, the plurality of member devices of the M-LAG are virtualized into one logic device. Therefore, a same VTEP IP address and a same MAC address need to be configured for the plurality of member devices that are of the M-LAG and that are in the VXLAN. For example, in FIG. 1, the leaf 102 and the leaf 103 have the same tunnel interface VTEP 2. In other words, the leaf 102 and the leaf 103 have the same VTEP IP address IP 2. When a network side forwards, to a user side, north-to-south traffic indicated by a black solid line in FIG. 1, the traffic is load shared to the leaf 102 and the leaf 103 by using equal-cost multi-path (ECMP). When the user side sends, to the network side, south-to-north traffic indicated by a dashed line in FIG. 1, traffic is load shared to the leaf 102 and the leaf 103 by using the M-LAG. The leaf 102 and the leaf 103 each forward a received part of the traffic to the network side according to a local preferential forwarding policy. In this embodiment of this application, the user side and the network side are relative to the access device. A side on which the access device is connected to the user device is referred to as the user side, and a side on which the access device is connected to the backbone device is referred to as the network side.

For the dual-homing user device VM 2 106, regardless of whether the traffic sent from the network side to the user side is forwarded to the leaf 102 or the leaf 103, the traffic is forwarded to the VM 2 106. There is no difference between the two forwarding paths. However, for single-homing user devices such as the VM 1 105 and the VM 3 107, there is a difference between sending the traffic to the leaf 102 and sending the traffic to the leaf 103. For example, after the spine 101 sends traffic destined for the VM 3 107 to the leaf 102, the leaf 102 determines that the VM 3 107 is not connected to the leaf 102. The leaf 102 forwards the traffic to the leaf 103 through a peer-link 104, and the leaf 103 forwards the traffic to the VM 3 107. Such a forwarding path causes an unnecessary traffic detour.

Figure 2:
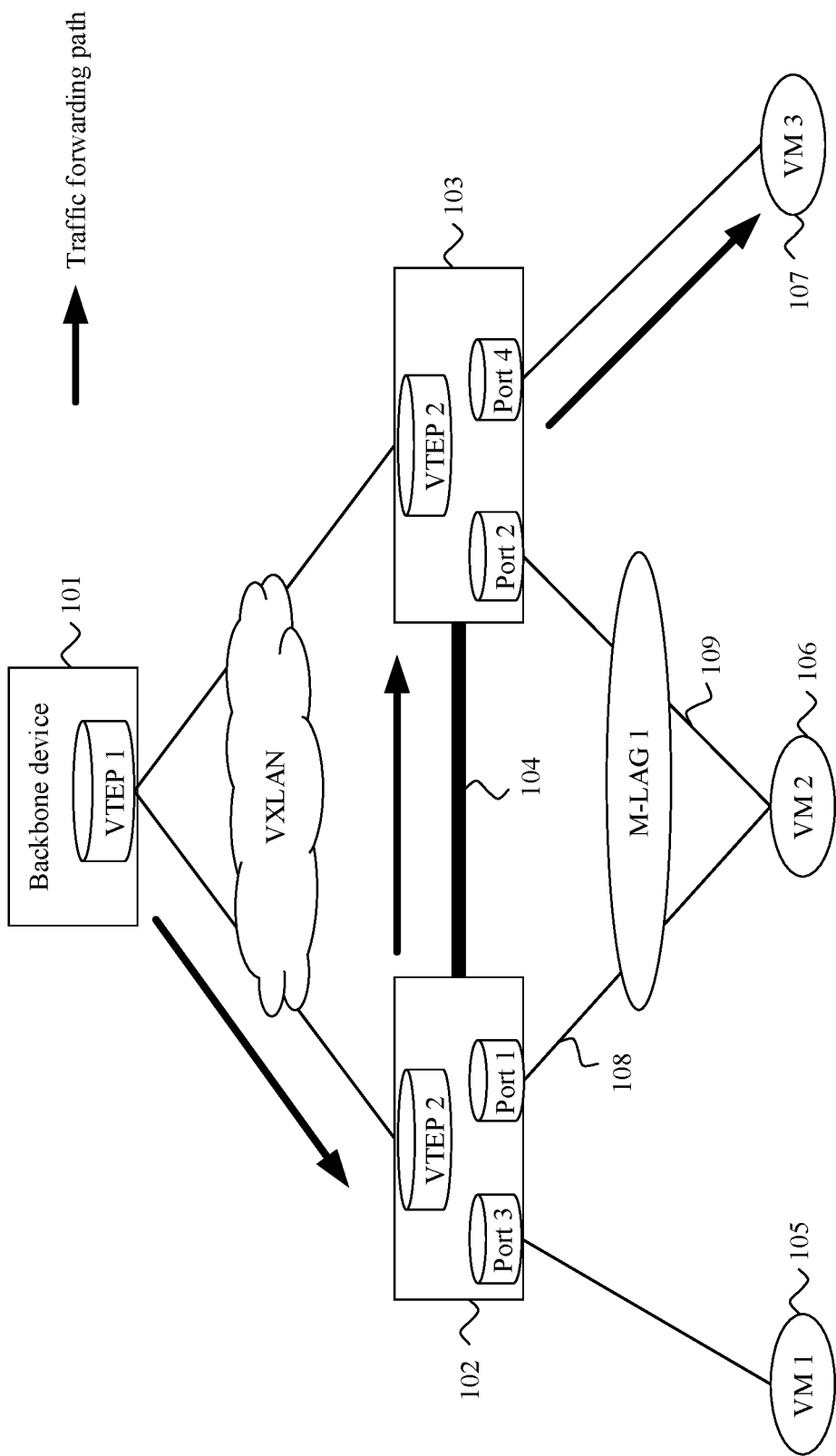
FIG. 2 is a schematic diagram of packet forwarding when an M-LAG accesses a VXLAN according to an embodiment of this application.

FIG. 2 is a schematic diagram of packet forwarding when an M-LAG accesses a VXLAN according to this application. As indicated by an arrow in FIG. 2, a packet to be sent to a single-homing user device VM 3 107 is sent by using a tunnel interface VTEP 1 on a spine 101. A same VTEP interface VTEP 2 is configured for a leaf 102 and a leaf 103, and the leaf 102 and the leaf 103 have a same IP address of the VTEP 2, namely, an IP 2. Therefore, the packet is forwarded to either the leaf 102 or the leaf 103. If the packet destined for the single-homing user device VM 3 107 is forwarded to the leaf 102, the leaf 102 needs to forward the packet to the leaf 103 through a peer-link 104. Only in this way, the packet may be normally forwarded to the single-homing user device VM 3 107. During packet forwarding, the spine 101 may send the packet to either the leaf 102 or the leaf 103. Therefore, there is a half probability for a unicast packet destined for a single-homing device to pass through the peer-link 104 between the leaf 102 and the leaf 103. This increases bandwidth pressure of the peer-link 104, and the peer-link needs to bear traffic generated by forwarding a BUM packet and a unicast packet that are destined for a single-homing user device. In a network system in which the M-LAG accesses the VXLAN, there is a small proportion of BUM packets, and there is a large proportion of unicast packets destined for the single-homing device. Therefore, most of bandwidth of the peer-link is occupied by the unicast packet destined for the single-homing user device. As a result, a large amount of network side-to-user side unicast traffic destined for a single-homing port causes heavy traffic pressure on the peer-link.

This embodiment of this application provides a traffic optimization solution for the single-homing user device. At least one single-homing tunnel interface that is used to only transmit data that needs to be sent to a single-homing user device is disposed on an access device connected to the single-homing user device, to implement traffic optimization when the M-LAG accesses the single-homing user device in the VXLAN. In this way, unicast traffic destined for the single-homing user device is not forwarded by using a horizontal link peer-link between two member devices of the M-LAG. In this embodiment of this application, a packet is encapsulated based on a different type of a port that is on an access device and that corresponds to a user device, so that packets destined for different types of user devices have different outer source IP addresses. In this way, a single-homing tunnel interface can be accurately selected from different VXLAN tunnels to forward data, so that the data is directly forwarded to the single-homing user device without passing through the peer-link. This reduces the bandwidth pressure of the peer-link and optimizes a forwarding path of the single-homing user device.

Figure 3:
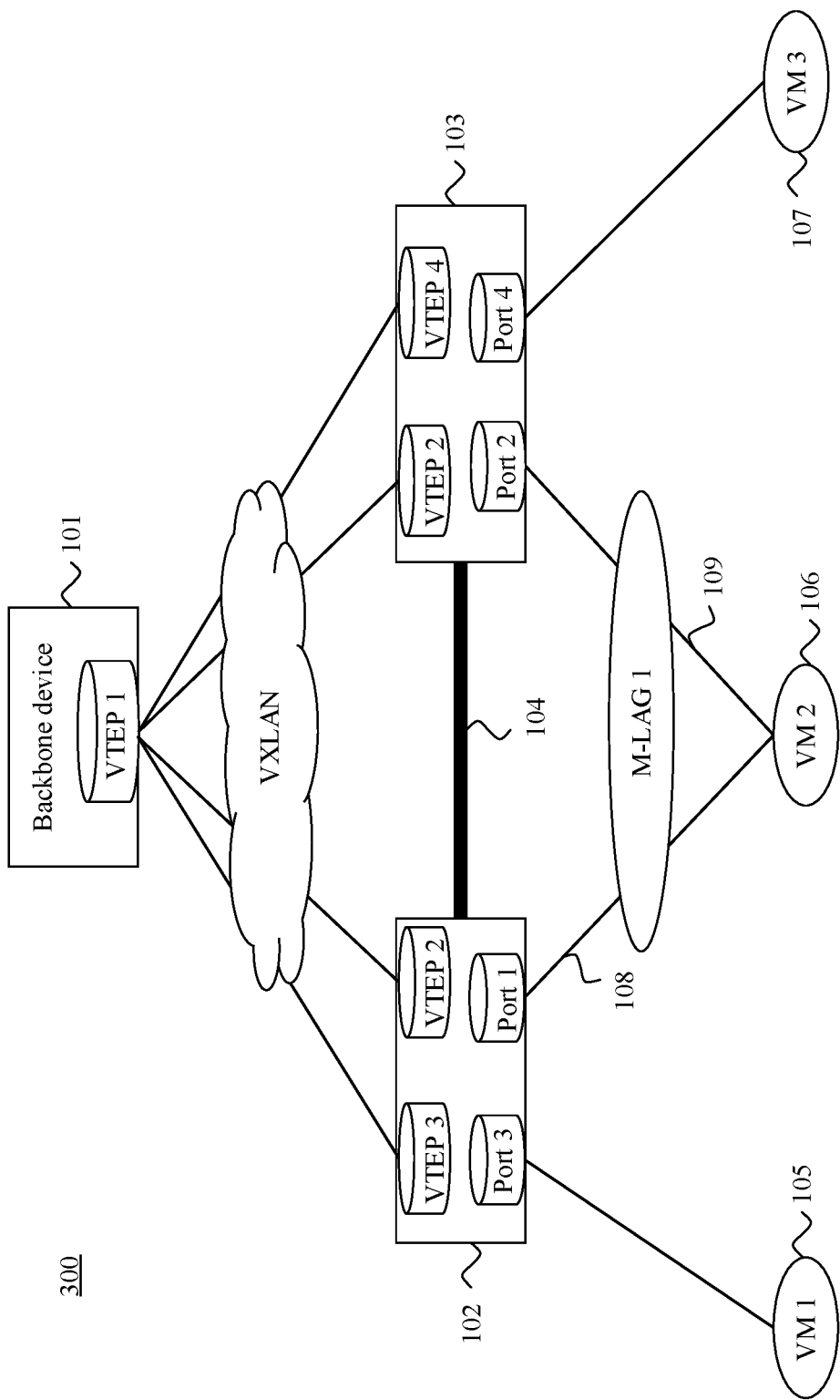
FIG. 3 is a schematic diagram of configuration when an M-LAG accesses a VXLAN according to an embodiment of this application.

FIG. 3 is a schematic diagram of configuration of a network system in which an M-LAG accesses a VXLAN according to an embodiment of this application. As shown in FIG. 3, the network system 300 includes at least one user device (for example, a VM 1 indicated by a single-homing user device 105, a VM 3 indicated by a single-homing user device 107, and a VM 2 indicated by a dual-homing user device 106 that are shown in FIG. 3), a backbone device spine 101, and at least two access devices (for example, a leaf 102 and a leaf 103). There is a communication connection between one user device and at least one access device. At least one single-homing port (for example, a port 3 and a port 4 in FIG. 3) is disposed on each access device connected to a single-homing user device. The single-homing port port 3 is used to only transmit data that needs to be sent to the VM 1 connected to the access device leaf 102. The port 4 is used to only transmit data that needs to be sent to the VM 3 107 connected to the leaf 103. In addition, at least one dual-homing port is disposed on each access device connected to a dual-homing user device, for example, a port 1 and a port 2 in FIG. 3. The dual-homing port may be used to transmit data that needs to be sent to the dual-homing user device, or used to transmit broadcast data, or used to transmit data that needs to be sent to a single-homing user device that is not connected to the access device. Specifically, for example, the dual-homing port may be used to transmit a BUM packet including a broadcast packet, a multicast packet, and an unknown unicast packet.

As shown in FIG. 3, the leaf 102 is connected to the single-homing user device VM 1 105, and the leaf 103 is connected to the single-homing user device VM 3 107. Therefore, a VTEP 3 is configured for the leaf 102, and a VTEP 4 is configured for the leaf 103. The VTEP 3 is used to only transmit data that needs to be sent to a single-homing user device connected to the leaf 102, such as the VM 1 105, and the VTEP 4 is used to only transmit data that needs to be sent to a single-homing user device connected to the leaf 103, such as the VM 3 107.

The backbone device spine 101 is configured with a common tunnel peer (peer) pointing to a VTEP 2 and two M-LAG single-homing peers pointing to the VTEP 3 and the VTEP 4 respectively. Based on the foregoing configuration, a tunnel between the spine 101 and the access device leaf 102 and that between the spine 101 and the leaf 103 are established, for example, VTEP 1-VTEP 3, VTEP 1-VTEP 2, and VTEP 1-VTEP 4.

The following describes, with reference to FIG. 4 to FIG. 5, a manner of forwarding network side-to-user side unicast traffic destined for a single-homing user device according to an embodiment of this application. User side-to-network side traffic is load shared to a member link of an M-LAG and reaches to a member device of the M-LAG through a common link. The member device forwards some received traffic to the network side according to a local preference principle, and then a network-side device forwards the traffic. Therefore, in the embodiments of this application, a network side-to-user side packet forwarding path is mainly described.

It should be noted that numbers "first", "second", and the like in the following description are merely used to distinguish between different described objects, for example, to distinguish between different user devices (for example, a first user device and a second user device), different data (for example, first data and second data), different device identifiers (for example, a first device identifier and a second device identifier), different tunnel interface identifiers (for example, a first tunnel interface identifier and a second tunnel interface identifier), or the like. This should not constitute any limitation on the technical solutions in the embodiments of this application.

FIG. 4 is a schematic flowchart of a data transmission method 400 according to an embodiment of this application. The method 400 may be applied to a backbone device. The backbone device is connected to at least two access devices. The at least two access devices form an M-LAG to connect to a multi-homing user device, and at least one of the at least two access devices is further configured to connect to a single-homing user device. each access device connecting to a single-homing user device has at least one single-homing interface, and the single-homing tunnel interface is used to only transmit data that needs to be sent to a single-homing user device connected to the access device.

As shown in FIG. 4, the method 400 includes the following content.

S410: A backbone device obtains first data that needs to be sent to a first user device, and determines, based on a first mapping table, a first tunnel interface identifier corresponding to the first user device, where the first user device is a single-homing user device.

Optionally, the backbone device stores the first mapping table. The first mapping table is used to indicate a tunnel interface identifier corresponding to each of a plurality of single-homing user devices, and the tunnel interface identifier corresponding to one single-homing user device is an identifier of a single-homing tunnel interface of an access device connected to the single-homing user device. In another implementation, the backbone device obtains the first mapping table. When receiving the first data that needs to be sent to the single-homing user device, the backbone device determines, based on the first mapping table, a single-homing tunnel interface identifier corresponding to the single-homing user device. It should be understood that the present invention is not limited thereto.

FIG. 3 is used as an example. The first mapping table may be used to indicate a tunnel interface identifier corresponding to the single-homing user device VM 1 and a tunnel interface identifier corresponding to the single-homing user device VM 3. According to the method 400 shown in FIG. 4, in other words, the first mapping table is used to determine a tunnel interface identifier of the tunnel interface VTEP 3 corresponding to the single-homing user device VM 1, or a tunnel interface identifier of the tunnel interface VTEP 4 corresponding to the single-homing user device VM 3.

As an example instead of a limitation, for example, in this embodiment of this application, the first mapping table may be further specifically used to indicate a mapping relationship between a plurality of device identifiers and a plurality of tunnel interface identifiers. One device identifier can uniquely indicate one tunnel interface identifier, and a first device identifier is used to indicate the first user device. Different device identifiers of user devices are mapped to different tunnel interface identifiers. The backbone device forwards data to a tunnel corresponding to the single-homing tunnel interface of the access device, to accurately forward a unicast packet that is destined for the single-homing user device to the access device connected to the single-homing user device. This implements optimal forwarding of unicast traffic on a single-homing port.

Optionally, for example, a single-homing VTEP enabling attribute is configured for the access port port 3 corresponding to the single-homing user device VM 1, and a single-homing VTEP enabling attribute is also configured for the access port port 4 corresponding to the VM 3. The single-homing port enabling attribute of the single-homing user device VM 1 corresponds to the tunnel interface identifier of the tunnel interface VTEP 3, and the single-homing port enabling attribute of the single-homing user device VM 3 corresponds to the tunnel interface identifier of the tunnel interface VTEP 4. Alternatively, a media access control MAC address of the single-homing user device VM 1 corresponds to the tunnel interface identifier of the tunnel interface VTEP 3, and a media access control MAC address of the single-homing user device VM 3 corresponds to the tunnel interface identifier of the tunnel interface VTEP 4. In this way, the backbone device forwards the data to the single-homing tunnel interface of the access device, to accurately forward the unicast packet that is destined for the single-homing user device to the access device connected to the single-homing user device. This implements optimal forwarding of unicast traffic on the single-homing user device.

S420: The backbone device sends, based on the first tunnel interface identifier, a first data packet including the first data to a first access device, where the first access device is an access device configured with the first tunnel interface identifier.

FIG. 3 is used as an example. When obtaining the first data that needs to be sent to the VM 1 (namely, the first user device), the backbone device spine determines, based on the first mapping table, the first tunnel interface identifier corresponding to the VM 1, to determine a packet forwarding path.

Optionally, the backbone device spine determines, based on the first mapping table, a tunnel interface identifier corresponding to a device identifier of a user device as the first tunnel interface identifier. For example, the backbone device determines, as the first tunnel interface identifier, the tunnel interface identifier of the VTEP 3 corresponding to the VM 1 that is configured with the single-homing port enabling attribute. When obtaining the first data that needs to be sent to the VM 1, the backbone device spine determines that the tunnel VTEP 1-VTEP 3 is a tunnel that the packet forwarding path needs to pass through.

Alternatively, the media access control MAC address of the VM 1 corresponds to the tunnel interface identifier of the tunnel interface VTEP 3. When a packet includes the MAC address of the VM 1, the backbone device spine determines that the tunnel VTEP 1-VTEP 3 is the tunnel that the packet forwarding path needs to pass through.

As an example instead of a limitation, for example, in this embodiment of this application, the first data may be data in a second data packet that is received by the backbone device spine and that includes the first device identifier. For example, second data may be a packet such as a unicast packet, a broadcast packet, a multicast packet, or an unknown unicast packet. The first data is a packet that is in the second data packet and that needs to be sent to the single-homing user device VM 1, and the first data includes a device identifier of the VM 1.

As an example instead of a limitation, the first device identifier may alternatively be a destination MAC address in the second data packet. When receiving the data that needs to be sent to the single-homing user device connected to the access device, the backbone device can accurately select a single-homing tunnel interface VTEP based on the destination MAC address. The backbone device encapsulates the first data based on the single-homing tunnel interface, and forwards encapsulated first data through a tunnel corresponding to the single-homing tunnel interface. This separates a forwarding path of the single-homing user device from that of a dual-homing user device, reduces bandwidth pressure of a peer-link, and optimizes the forwarding path of the single-homing user device.

As an example instead of a limitation, for example, in this embodiment of this application, the first data may be data carried in the unicast packet.

In a VXLAN, with reference to this embodiment of this application, after obtaining an original packet, the spine performs VXLAN encapsulation on the tunnel interface VTEP 1. A format of an encapsulated VXLAN packet is shown in Table 1. An outer IP header (Outer IP header) of the encapsulated VXLAN packet carries an outer source IP address and an outer destination IP address. The outer source IP address is an IP address of a VTEP of the spine, and the outer destination IP address is a VTEP IP address of a tunnel interface corresponding to a destination VM. For example, for a packet sent from the spine to the VM 1, the outer source IP address is an IP 1 (an IP address of the VTEP 1), and the outer destination IP address is an IP 3 (an IP address of the single-homing tunnel interface VTEP 3). The outer destination IP address of the outer IP header may be a unicast address or a multicast address. During unicast, the outer destination IP address is the IP address of the VTEP. During multicast, a VXLAN management layer is introduced, and the VTEP is determined based on a mapping between a VXLAN network identifier (VXLAN Network Identifier, VNI) and an IP multicast group.

TABLE 1

VXLAN packet format

| Outer Ethernet header | Outer IP header | Outer UDP header | VXLAN header | Inner Ethernet header | Inner IP header | Data payload |
|---|---|---|---|---|---|---|
| VXLAN encapsulation | | | | Original packet | | |

S430: The backbone device spine sends, based on the first tunnel interface identifier by using the VXLAN, the first data packet including the first data to the first access device, where the first access device is configured with a single-homing tunnel interface indicated by the first tunnel interface identifier.

In this embodiment, the backbone device spine performs, based on the tunnel interface identifier of the VTEP 3, VXLAN encapsulation on an original packet destined for the single-homing user device VM 1, and forwards an obtained VXLAN packet to the leaf 102 through the tunnel identified by VTEP 1-VTEP 3. The leaf 102 receives the VXLAN packet by using the single-homing tunnel interface VTEP 3, and obtains the original packet destined for the single-homing user device VM 1 after decapsulating the VXLAN packet. Then the original packet is sent to the VM 1 by using the leaf 102 and the single-homing port port 3 corresponding to the VM 1.

In this embodiment of this application, traffic optimization for connecting the multi-chassis link aggregation group M-LAG to the single-homing access device in the virtual extensible local area network VXLAN is implemented. When the M-LAG accesses the VXLAN, at least one single-homing tunnel interface that is used to only transmit the data that needs to be sent to the single-homing user device is disposed on the access device connected to the single-homing user device, so that main traffic in the VXLAN, namely, unicast traffic destined for the single-homing user device, is not forwarded through the horizontal link peer-link between a plurality of member devices, namely, access devices, of the M-LAG. This reduces the bandwidth pressure of the peer-link and optimizes the forwarding path of the single-homing user device.

After a VXLAN tunnel is established, a decapsulation entry is delivered at the backbone device and the access device. A corresponding outer source IP address is an IP address of a peer VTEP, and a corresponding outer destination IP address is an IP address of a local VTEP. After a device (the backbone device or the access device) receives the VXLAN packet, if the outer source IP address and the outer destination IP address of the VXLAN packet match a decapsulation entry of the device, the device needs to terminate the VXLAN packet. If the outer source IP address and the outer destination IP address of the VXLAN packet do not match the decapsulation entry of the device, the device is a transit device, and needs to continue to forward the VXLAN packet to a downstream device. Based on the configuration in FIG. 3, a decapsulation entry generated by each device is shown in Table 2.

When the backbone device spine receives a BUM packet (for example, the second data packet) including a broadcast packet, a multicast packet, and an unknown unicast packet, because the VXLAN tunnel is a layer-2 egress port, a VXLAN tunnel header needs to be added to a VXLAN broadcast domain, so that the BUM packet including the broadcast packet, the multicast packet, and the unknown unicast packet may be replicated to the VXLAN tunnel in the broadcast domain. A table used for BUM packet sending is a VXLAN ingress replication list. In FIG. 3, there are two peers on the spine 101 that point to the leaf 102. Single-homing peers (the VTEP 1 to the VTEP 3) of the M-LAG do not need to be added to the ingress replication list. Otherwise, BUM traffic from the spine 101 to the leaf 102 is duplicated. Specially, Table 2 shows ingress replication lists on three devices. Separating a VXLAN decapsulation entry from the VXLAN ingress replication list can prevent a problem that the spine 101 replicates the BUM packet for a plurality of times to a same access device through different VXLAN tunnels when the spine 101 selects a single-homing tunnel interface or a dual-homing tunnel interface to send the BUM packet.

TABLE 2

Decapsulation entry and ingress replication list of a device

| Device | Decapsulation entry (source IP address + destination IP address) | Ingress replication list |
|---|---|---|
| Spine | VTEP 2 + VTEP 1 | VTEP 2 |
| | VTEP 3 + VTEP 1 | |
| | VTEP 4 + VTEP 1 | |
| Leaf | VTEP 1 + VTEP 2 | VTEP 1 |
| | VTEP 1 + VTEP 3 | |
| Leaf | VTEP 1 + VTEP 2 | VTEP 1 |
| | VTEP 1 + VTEP 4 | |

In the prior art, a spine sends, by using a same tunnel interface, a packet destined for a single-homing user device and a packet destined for a dual-homing user device. If the spine sends the packet destined for the single-homing user device to another access device different from an access device connected to the single-homing user device, the another access device needs to forward the packet to the access device connected to the single-homing user device through a horizontal link peer-link between access devices. This causes great traffic pressure on the horizontal link peer-link. In this embodiment of this application, at least one single-homing tunnel interface that is used to only transmit the data that needs to be sent to the single-homing user device is disposed on the access device connected to the single-homing user device. In this way, unicast traffic is forwarded, by using the single-homing tunnel interface, to the access device connected to the single-homing user device, to implement optimal forwarding of unicast traffic destined for the single-homing user device, so that the unicast traffic destined for the single-homing user device is not forwarded through the horizontal link peer-link between a plurality of member devices, namely, access devices, of the M-LAG. This reduces the bandwidth pressure of the peer-link and optimizes the forwarding path of the single-homing user device. An original tunnel interface (namely, the dual-homing tunnel interface) of the access device is used to transmit at least one of data that needs to be sent to the dual-homing user device, broadcast data, and data that needs to be sent to a single-homing user device that is not connected to the access device. This implements path separation and reduces bandwidth pressure.

FIG. 5 is another schematic block diagram of a data transmission method 500 according to an embodiment of this application. The method 500 may be applied to a first access device. The first access device and a second access device form an M-LAG to connect to a multi-homing user device, and the first access device is further configured to connect to a single-homing user device. the first access device has a single-homing tunnel interface, and the single-homing tunnel interface is used to only transmit data that needs to be sent to a single-homing user device connected to the first access device. However, this embodiment of this application is not limited thereto.

As shown in FIG. 5, the method 500 includes the following content.

S510: The first access device receives, by using a first single-homing tunnel interface, a first data packet including first data, where the first data is destined for a first user device, the first single-homing tunnel interface is a single-homing tunnel interface indicated by a first tunnel interface identifier, the first tunnel interface identifier is a tunnel interface identifier corresponding to the first user device, and the first user device is the single-homing user device connected to the first access device.

FIG. 3 is used as an example. Specifically, according to S510, the backbone device spine 101 encapsulates a packet (the first data) destined for the single-homing user device VM 1 into a VXLAN packet (the first data packet) to send the VXLAN packet to the leaf 102, and forwards the VXLAN packet to the leaf 102 through the tunnel identified by VTEP 1-VTEP 3. The leaf 102 receives the VXLAN packet by using the VTEP 3.

The leaf 102 needs to receive, by using the tunnel interface VTEP 3, the packet destined for the user device VM 1 connected to the leaf 102. The leaf 102 first enables the spine 101 to learn about the VTEP 3. When forwarding, to the spine 101, a packet sent by the VM 1, the leaf 102 selects an outer source IP address based on whether a port (the port 3) that is of the leaf 102 and that is connected to the VM 1 is configured with a single-homing VTEP enabling attribute. If the port 3 is configured with the single-homing VTEP enabling attribute, the outer source IP address is an IP address of the VTEP 3 (which is denoted as VTEP 3). If the port 3 is not configured with the single-homing VTEP enabling attribute, the outer source IP address is a VTEP 2. Processing on the leaf 103 is similar to that on the leaf 102. Details are not described herein again. When receiving the packet from the VM 1 sent by the leaf 102, the spine 101 learns about that a tunnel egress interface corresponding to the VM 1 is the VTEP 3. When receiving a packet from the VM 2 sent by the leaf 102 or the leaf 103, the spine 101 learns about that a tunnel egress interface corresponding to the VM 2 is the VTEP 2. When receiving a packet from the VM 3 sent by the leaf 103, the spine 101 learns about that a tunnel egress interface corresponding to the VM 3 is a VTEP 4. Through the foregoing process, a forwarding table learned by the spine 101 is shown in Table 3.

TABLE 3

| Forwarding entry on a spine | |
|---|---|
| VM | Egress port of a forwarding entry |
| VM 1 | VXLAN TUNNEL (VTEP 3 – VTEP 1) |
| VM 2 | VXLAN TUNNEL (VTEP 2 – VTEP 1) |
| VM 3 | VXLAN TUNNEL (VTEP 4 – VTEP 1) |

After the foregoing learning, there are two encapsulation types of a unicast packet sent from the backbone device to the access device, for example, traffic sent from the spine 101 to the leaf 102. Outer destination IP addresses are the VTEP 2 and the VTEP 3 respectively. A source IP address that is in a VXLAN header and that is encapsulated varies with different types of the user device. In this way, a forwarding path of the single-homing user device can be separated from that of a dual-homing user device without separating the forwarding entries.

A broadcast packet, a multicast packet, or an unknown unicast packet sent from the backbone device to the access device, for example, a BUM packet sent from the spine 101 to the leaf 102 or a BUM packet sent from the spine 101 to the leaf 103, are processed differently on the spine 101. Referring to the ingress replication list in Table 2, the spine 101 replicates the BUM packet to obtain only one copy and sends the copy to the VTEP 2, and does not replicate the BUM packet to the single-homing VTEP 3 and VTEP 4.

S520: The first access device processes the first data packet to obtain the first data. As described above, in a VXLAN, a packet is encapsulated on a tunnel interface. The first data packet received by the first access device includes a tunnel header of the VXLAN. Therefore, the first access device needs to decapsulate the first data packet to obtain the first data that needs to be sent to the first user device.

S530: The first access device sends the first data to the first user device.

Specifically, FIG. 3 is used as an example, and the leaf 102 may send the first data to the VM 1.

In the prior art, different types of data sent to the single-homing user device and the dual-homing user device is forwarded by using one port. For the single-homing user device, if the data is sent to an access device that is not connected to the single-homing user device, the data needs to be forwarded through a horizontal link peer-link between access devices. Therefore, this causes great traffic pressure on the horizontal link peer-link. In this embodiment of this application, unicast traffic destined for the single-homing user device is distinguished from another traffic path. At least one single-homing port that is used to only transmit data that needs to be sent to a single-homing user device is disposed on the access device connected to the single-homing user device. In this way, the unicast traffic is forwarded, by using the single-homing tunnel interface, to the access device connected to the single-homing user device, to implement traffic optimization for the single-homing user device, so that the unicast traffic destined for the single-homing user device is not forwarded through the horizontal link peer-link between a plurality of member devices, namely, the access devices, of the M-LAG. This reduces bandwidth pressure of the peer-link, optimizes a forwarding path of the single-homing user device, and implements optimal forwarding of the unicast traffic destined for the single-homing user device. An original port (namely, a dual-homing port) of the access device is used to transmit data that needs to be sent to the dual-homing user device, and/or the dual-homing port is used to transmit broadcast data, and/or the dual-homing port is used to transmit data that needs to be sent to a single-homing user device that is not connected to the access device. This implements path separation and reduces bandwidth pressure.

According to the solution provided in this embodiment of this application, traffic optimization for connecting the M-LAG to the single-homing access device in the VXLAN is implemented. At least one single-homing port that is used to only transmit the data that needs to be sent to the single-homing user device is disposed on the access device connected to the single-homing user device, to implement traffic optimization for the single-homing user device, so that main traffic in the VXLAN, namely, the unicast traffic destined for the single-homing user device, is not forwarded through the horizontal link peer-link between the plurality of member devices, namely, the access devices, of the M-LAG. A packet is encapsulated based on a port type, so that the packet has different source IP addresses. In this way, a single-homing tunnel interface can be accurately selected from different VXLAN tunnels to forward data, so that the data is directly forwarded to the single-homing user device without passing through the peer-link. This reduces the bandwidth pressure of the peer-link, optimizes a forwarding path of the single-homing port, and implements optimal forwarding of the unicast traffic.

FIG. 6 is a schematic block diagram of a backbone device according to an embodiment of this application. Specifically, the backbone device 600 is disposed in a network system that includes at least two access devices. There is a communication connection between the at least two access devices, and the at least two access devices are configured to connect to a multi-homing user device. At least one of the at least two access devices is further configured to connect to a single-homing user device. Each single-homing user device is connected to only one access device, and each access device connected to the single-homing user device is configured with at least one single-homing tunnel interface that is used to only transmit data that needs to be sent to a single-homing user device connected to the access device.

In this embodiment of this application, the backbone device 600 may include a storage unit 610, a processing unit 620, and a communications unit 630.

The storage unit 610 is configured to store a first mapping table. The first mapping table is used to indicate a tunnel interface identifier corresponding to each of a plurality of single-homing user devices, and the tunnel interface identifier corresponding to one single-homing user device is an identifier of a single-homing tunnel interface of an access device connected to the single-homing user device.

The processing unit 620 is configured to: when the communications unit 630 obtains first data that needs to be sent to the single-homing user device, determine, based on the first mapping table, a tunnel interface identifier corresponding to the single-homing user device.

The communications unit 630 is configured to send, based on the tunnel interface identifier determined by the processing unit 620 and by using a single-homing tunnel interface indicated by the tunnel interface identifier, a first data packet including the first data to the access device connected to the single-homing user device.

It should be understood that the backbone device 600 may correspond to (for example, may be configured as or may be) the backbone device spine described in the method 400, and modules or units in the device 600 are respectively configured to perform actions or processing processes performed by the backbone device spine in the method 400.

It should be further understood that the backbone device 600 shown in FIG. 6 is merely an example. The data transmission apparatus in this embodiment of this application may further include another module or unit, or a module having a function similar to the function of each module in FIG. 6, or may not necessarily include all modules in FIG. 6.

Figure 7:
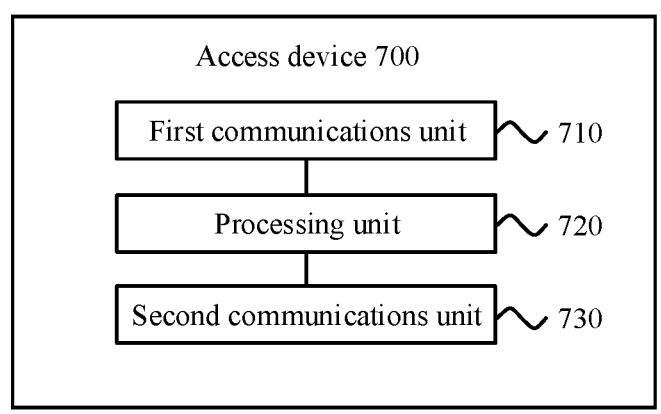
FIG. 7 is a schematic block diagram of an access device according to an embodiment of this application.

FIG. 7 is a schematic block diagram of an access device according to an embodiment of this application. The access device is disposed in a network system that includes a backbone device and at least two access devices. There is a communication connection between the at least two access devices, and the at least two access devices are configured to connect to a multi-homing user device. At least one of the at least two access devices is further configured to connect to a single-homing user device. Each single-homing user device is connected to only one access device, and each access device connected to the single-homing user device is configured with at least one single-homing tunnel interface that is used to only transmit data that needs to be sent to a single-homing user device connected to the access device.

In this embodiment of this application, the access device 700 may include a first communications unit 710, a processing unit 720, and a second communications unit 730.

The first communications unit 710 is specifically configured to receive, by using a single-homing tunnel interface, a first data packet including first data. The first data is destined for a single-homing user device, the single-homing tunnel interface is indicated by a tunnel interface identifier, and the tunnel interface identifier corresponds to the single-homing user device.

The processing unit 720 is configured to process the first data packet to obtain the first data. As described above, in a VXLAN, a packet is encapsulated on a tunnel interface. The first data packet received by the first communications unit 710 includes a tunnel header of the VXLAN. Therefore, the processing unit 720 needs to decapsulate the first data packet to obtain the first data that needs to be sent to a first user device.

The second communications unit 730 is specifically configured to send the first data to the single-homing user device.

It should be understood that the access device 700 may correspond to (for example, may be configured as or may be) the access device described in the method 500, and modules or units in the device 700 are separately configured to perform actions or processing processes performed by the access device in the method 500. To avoid repetition, detailed descriptions thereof are omitted.

It should be further understood that the access device 700 shown in FIG. 7 is merely an example. The data transmission apparatus in this embodiment of this application may further include another module or unit, or a module having a function similar to the function of each module in FIG. 7, or may not necessarily include all modules in FIG. 7.

Figure 8:
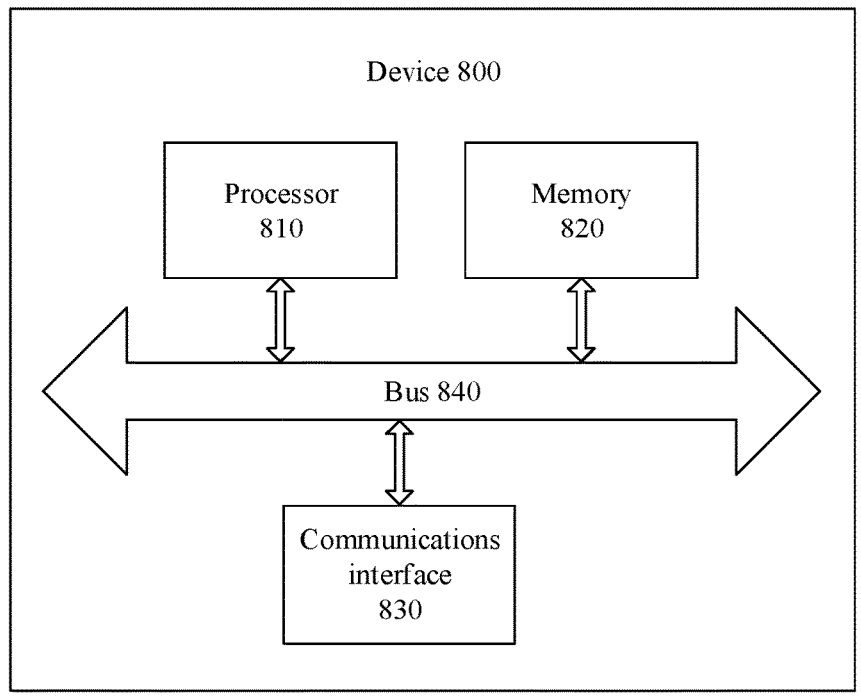
FIG. 8 is a schematic block diagram of a data transmission device 800 according to an embodiment of this application.

FIG. 8 is a schematic block diagram of a data transmission device 800 according to an embodiment of this application. The device may be the backbone device or the access device in the foregoing methods. The device 800 includes a processor 810, a memory 820, a communications interface 830, and a bus 840. The processor 810, the memory 820, and the communications interface 830 may implement communication by using the bus 840, or may implement communication in another manner such as wireless transmission. The memory 820 is configured to store an instruction, and the processor 810 is configured to execute the instruction stored in the memory 820. The memory 820 stores program code. The processor 810 may invoke the program code stored in the memory 820, to control the communications interface 830 to receive and send information or a signal, so that the device 800 performs functions of the processing unit in the backbone device in the method 400, and performs actions or processing processes performed by the processing unit, or performs functions of the processing unit in the access device in the method 500, and performs actions or processing processes performed by the processing unit. Herein, to avoid repetition, detailed descriptions thereof are omitted.

If the device 800 is a backbone device, the memory 820 further stores a first mapping table. The first mapping table is used to indicate a tunnel interface identifier corresponding to each of a plurality of single-homing user devices, and the tunnel interface identifier corresponding to one single-homing user device is an identifier of a single-homing tunnel interface of an access device connected to the single-homing user device. The processor 810 may be configured to: after obtaining first data that needs to be sent to a first user device, determine, based on the first mapping table, a first tunnel interface identifier corresponding to the first user device. The first user device is a single-homing user device. The processor 810 may further be configured to control the communications interface 830 to send, to a first access device based on the first tunnel interface identifier, a first data packet including the first data. The first access device is an access device configured with a single-homing port indicated by the first tunnel interface identifier.

If the device 800 is an access device, the communications interface 830 may be used to receive, by using a single-homing tunnel interface (for example, may correspond to an Ethernet interface 914 in a network device 900), the first data packet including the first data. The processor 810 processes the first data packet to obtain the first data, and the communications interface 830 sends the first data to a single-homing user device. The first data is destined for the single-homing user device, the single-homing tunnel interface is indicated by a tunnel interface identifier, and the tunnel interface identifier corresponds to the single-homing user device.

Figure 9:
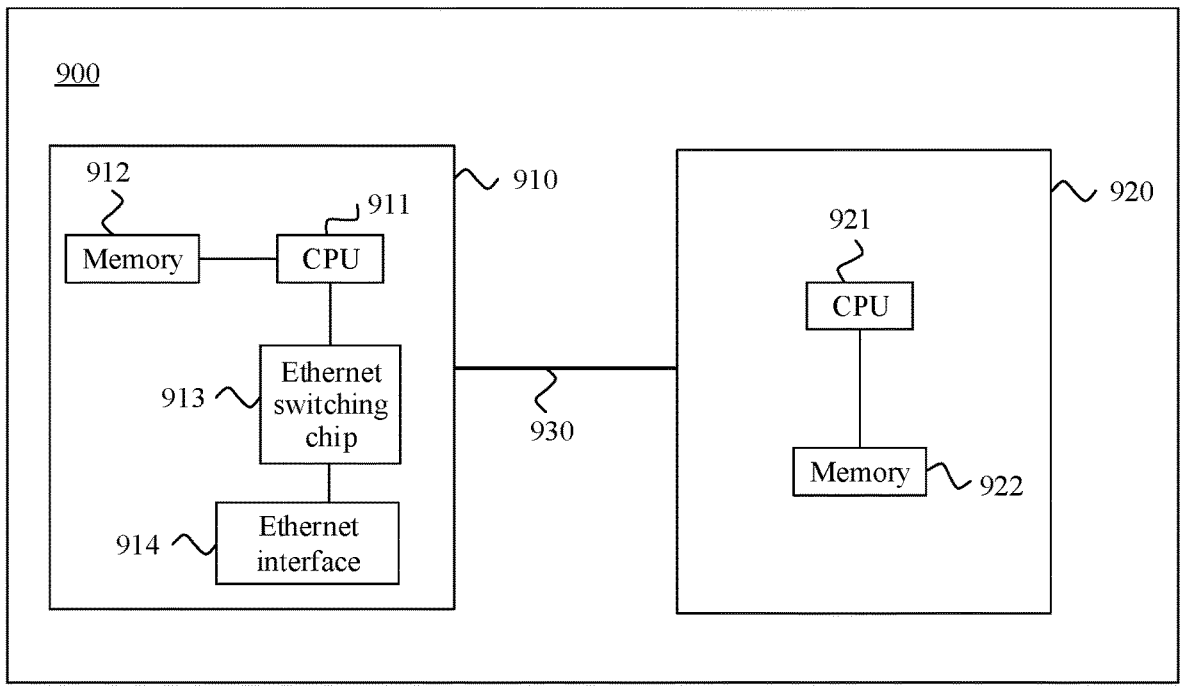
FIG. 9 is a schematic block diagram of another data transmission device 900 according to an embodiment of this application.

FIG. 9 is a schematic block diagram of another data transmission device 900 according to an embodiment of this application. As shown in FIG. 9, the device 900 (for example, a backbone device or an access device) usually includes an interface board 910 and a main control board 920. The interface board 910 may be connected to the main control board 920 by using an internal bus 930. The interface board 910 includes a central processing unit (central processing unit, CPU) 911, a memory 912, an Ethernet switching chip (LAN switch, LSW) 913, an Ethernet interface 914, and the like. The main control board 920 includes a CPU 921, a memory 922, and the like.

A system memory of the main control board and a card memory of the interface board are jointly mapped to memory space of the data transmission device. The CPU is a control unit of the main control board and the interface board that are of the network device. The memory may include, for example, a random access memory (random access memory, RAM) and/or a flash (Flash) memory. A running program and a statically configured parameter may be stored in the flash memory, and code executed during program running and data may be stored in the RAM connected to the CPU. Optionally, the LSW 913 may be configured with an external RAM to store content of a forwarded packet, to resolve that an internal buffer of the LSW chip is insufficient. Ethernet interface docking between optical interfaces or electrical interfaces of devices is completed at a physical layer PHY connected to the LSW 913.

During packet forwarding, the Ethernet switching chip LSW 913 of the interface board 910 of the network device receives an Ethernet data packet from an outside of the network device by using the Ethernet interface 914. The LSW 913 receives a configuration instruction, a forwarding entry, and the like from the CPU, to guide a packet forwarding behavior of the LSW 913.

In this embodiment of this application, the CPU 921 and the CPU 911 may correspond to the processor 810 in the device 800, and the LSW 913 and the Ethernet interface 914 may correspond to the communications interface 830 in the device 800. Specific functions of the modules or units are described above in detail. For brevity, details are not described herein again.

In this embodiment of this application, the CPU of the main control board cooperates with the CPU of the interface board to control a forwarding behavior of the LSW, to implement traffic optimization for connecting an M-LAG to a single-homing user device in a VXLAN. This makes main traffic in the VXLAN, namely, unicast traffic to be sent to the single-homing user device, not forwarded through a peer-link, to reduce bandwidth pressure of the peer-link.

It should be noted that the foregoing method embodiments may be applied to a processor or may be implemented by a processor. The processor may be an integrated circuit chip and has a signal processing capability. In an implementation process, steps in the foregoing method embodiments may be implemented by using a hardware integrated logical circuit in the processor or an instruction in a form of software. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and completed by using a hardware decoding processor, or may be executed and completed by using a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the systems and methods described in this specification includes but is not limited to these memories and memories of any other proper types.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of the present invention. The execution sequences of the processes should be determined based on functions and internal logic of the processes, and should not constitute any limitation on the implementation processes of the embodiments of the present invention.

A person of ordinary skill in the art may be aware that, in combination with the example units, algorithms, and steps described in the embodiments disclosed in this specification, the embodiments may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing system, apparatus, and units, refer to a corresponding process in the foregoing method embodiments. Details are not described herein again.

In the plurality of embodiments provided in this application, it should be understood that the disclosed system, apparatus, and method may be implemented in another manner. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual coupling or a direct coupling or a communication connection may be implemented by using some interfaces. An indirect coupling or a communication connection between the apparatuses or units may be implemented in an electronic form, a mechanical form, or in another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions in the embodiments.

In addition, functional units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of this application, but are not intended to limit a protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, applied to a first network device, wherein the first network device and a second network device form a multi-chassis link aggregation group to connect to a multi-homing user device, the first network device further connects to a single-homing user device, and the method comprises:

obtaining, by the first network device, first data from the single-homing user device;

sending, by the first network device, according to a first tunnel interface identifier, a first data packet comprising the first data to a third network device, wherein the first data packet further comprises the first tunnel interface identifier, the first network device is configured with the first tunnel interface identifier, the first tunnel interface identifier is an identifier of a first single-homing tunnel interface of the first network device, and the first single-homing tunnel interface is a tunnel interface on the first network device, the tunnel interface corresponding to the single-homing user device and is configured to transmit data corresponding to the single-homing user device;

obtaining, by the first network device, second data from the multi-homing user device; and sending, by the first network device, a second data packet comprising the second data to the third network device, wherein the second data packet further comprises a multi-homing tunnel interface identifier, the multi-homing tunnel interface identifier is an identifier of a multi-homing tunnel interface configured for the multi-homing user device and is different than the first tunnel interface identifier.

2. The method according to claim 1, wherein the first network device and the second network device support a virtual extensible local area network (VXLAN) function; and the sending, by the first network device, according to a first tunnel interface identifier, a first data packet comprising the first data to a third network device comprises:

sending, by the first network device, the first data packet through a VXLAN tunnel corresponding to the first single-homing tunnel interface, wherein the first data packet comprises a VXLAN tunnel header, and an outer source address field of the VXLAN tunnel header comprises the first tunnel interface identifier.

3. The method according to claim 1, wherein the first network device and the second network device have a common multi-homing tunnel interface; and the common multi-homing tunnel interface is used to transmit data corresponding to the multi-homing user device, or to transmit broadcast data, or to transmit data that corresponds to a single-homing user device that is not connected to the first network device.

4. A data transmission method, applied to a first network device, wherein the first network device is connected to at least two network devices, the at least two network devices form a multi-chassis link aggregation group to connect to a multi-homing user device, wherein a second network device of the at least two network devices further connects to a single-homing user device, and the method comprises:

obtaining, by the first network device, first data that is destined for the single-homing user device;

sending, by the first network device according to a first tunnel interface identifier, a first data packet comprising the first data to the second network device, wherein the first data packet further comprises the first tunnel interface identifier, the second network device is configured with the first tunnel interface identifier, the first tunnel interface identifier is an identifier of a first single-homing tunnel interface of the second network device, and the first single-homing tunnel interface is a tunnel interface on the second network device corresponding to the single-homing user device and is configured to transmit data to the single-homing user device;

obtaining, by the first network device, second data that is destined for the multi-homing user device; and sending, by the first network device according to a multi-homing tunnel interface identifier, a second data packet comprising the second data to the second network device, wherein the second data packet further comprises the multi-homing tunnel interface identifier, the multi-homing tunnel interface identifier is an identifier of a multi-homing tunnel interface configured for the multi-homing user device and is different than the first tunnel interface identifier.

5. The method according to claim 4, wherein the method further comprises:

determining, by the first network device based on a first mapping table, the first tunnel interface identifier corresponding to the first single-homing user device.

6. The method according to claim 4, wherein the first network device and each of the at least two network devices support a virtual extensible local area network (VXLAN) function; and the sending, by the first network device according to a first tunnel interface identifier, a first data packet comprising the first data to a second network comprises:

generating, by the first network device, the first data packet, wherein the first data packet comprises a VXLAN tunnel header, and an outer destination address field of the VXLAN tunnel header comprises the first tunnel interface identifier; and sending, by the first network device, the first data packet to the second network device through a VXLAN tunnel corresponding to the first tunnel interface identifier.

7. The method according to claim 5, wherein the first mapping table indicates a mapping relationship between an identifier of each of a plurality of single-homing user devices and a tunnel interface identifier corresponding to the single-homing user device; and the determining, by the first network device based on a first mapping table, the first tunnel interface identifier corresponding to the first single-homing user device comprises:

determining, by the first network device based on the first mapping table, a tunnel interface identifier corresponding to a first device identifier as the first tunnel interface identifier, wherein the first device identifier is used to indicate the first single-homing user device.

8. The method according to claim 4, wherein the first data is data carried in a second data packet received by the first network device, and the second data packet comprises the first device identifier.

9. The method according to claim 4, wherein at least one multi-homing tunnel interface is configured for the multi-homing user device, and the at least one multi-homing tunnel interface is configured with a tunnel interface identifier different than the first tunnel interface identifier.

10. A first network device for data transmission, wherein the first network device and a second network device form a multi-chassis link aggregation group to connect to a multi-homing user device, wherein a multi-homing tunnel interface is configured for the multi-homing user device, the first network device further connects to a single-homing user device, and the first network device comprises:

a memory storing instructions;

a processor coupled to the memory, wherein when the instructions are executed by the processor, the instructions cause the first network device to:

receive, via a first single-homing tunnel interface, a first data packet comprising first data, wherein the first data is destined for the single-homing user device, the first single-homing tunnel interface is indicated by a first tunnel interface identifier comprised in the first data packet and is configured to transmit data corresponding to the single-homing user device, the first tunnel interface identifier is a tunnel interface identifier corresponding to the single-homing user device, and wherein the multi-homing tunnel interface is configured with a tunnel interface identifier different than the first tunnel interface identifier;

send, the first data to the first single-homing user device.

11. The first network device according to claim 10, wherein the first network device and the second network device support a virtual extensible local area network (VXLAN) function; and the receiving, via a first single-homing tunnel interface, a first data packet comprising first data comprises:

receiving, the first data packet through a VXLAN tunnel corresponding to the first single-homing tunnel interface, wherein the first data packet comprises a VXLAN tunnel header, and an outer destination address field of the VXLAN tunnel header comprises the first tunnel interface identifier.

12. The first network device according to claim 10, wherein the first network device and the second network device have a common multi-homing tunnel interface; and the common multi-homing tunnel interface is used to transmit data corresponding to the multi-homing user device, or to transmit broadcast data, or to transmit data that corresponds to a single-homing user device that is not connected to the first network device.

13. A first network device for data transmission, wherein the first network device and a second network device form a multi-chassis link aggregation group to connect to a multi-homing user device, the first network device further connects to a single-homing user device, and the first network device comprises:

a memory storing instructions;

a processor coupled to the memory, wherein when the instructions are executed by the processor, the instructions cause the first network device to:

obtain, first data from the single-homing user device;

send, according to a first tunnel interface identifier, a first data packet comprising the first data to a third network device, wherein the first data packet further comprises the first tunnel interface identifier, the first network device is configured with the first tunnel interface identifier, the first tunnel interface identifier is an identifier of a first single-homing tunnel interface of the first network device, and the first single-homing tunnel interface is a tunnel interface on the first network device and is configured to transmit data corresponding to the single-homing user device;

obtain second data from the multi-homing user device; and send a second data packet comprising the second data to the third network device according to the multi-homing tunnel interface identifier, wherein the multi-homing tunnel interface identifier is an identifier of a multi-home tunnel interface configured for the multi-homing user device, and is different than the first tunnel interface identifier.

14. The first network device according to claim 13, wherein the first network device and the second network device support a virtual extensible local area network (VXLAN) function; and the send, according to a first tunnel interface identifier, a first data packet comprising the first data to a third network device comprises:
send, the first data packet through a VXLAN tunnel corresponding to the first single-homing tunnel interface, wherein the first data packet comprises a VXLAN tunnel header, and an outer source address field of the VXLAN tunnel header comprises the first tunnel interface identifier.

15. The first network device according to claim 13, wherein the first network device and the second network device have a common multi-homing tunnel interface; and the common multi-homing tunnel interface is used to transmit data corresponding to the multi-homing user device, or to transmit broadcast data, or to transmit data that corresponding to a single-homing user device that is not connected to the first network device.

16. A first network device for data transmission, wherein the first network device is connected to at least two network devices, the at least two network devices form a multi-chassis link aggregation group to connect to a multi-homing user device, wherein a second network device of the at least two network devices further connects to a single-homing user device, and the first network device comprises:

a memory storing instructions;
a processor coupled to the memory, wherein when the instructions are executed by the processor, the instructions cause the first network device to:
obtain, first data that is destined for the single-homing user device;
send, according to a first tunnel interface identifier, a first data packet comprising the first data to a second network device of the at least two network devices, wherein the first data packet further comprises the first tunnel interface identifier, the second network device is configured with the first tunnel interface identifier, the first tunnel interface identifier is an identifier of a first single-homing tunnel interface of the second network device, and the first single-homing tunnel interface is configured to transmit data corresponding to the single-homing user device connected to the second network device;

obtain second data that is destined for the multi-homing user device; and send a second data packet comprising the second data to the second network device according to the multi-homing tunnel interface identifier, wherein the multi-homing tunnel interface identifier is an identifier of a multi-homing tunnel interface configured for the multi-homing user device and is different than the first tunnel interface identifier.

17. The first network device according to claim 16, wherein the instructions further cause the first network device to:
determine, based on a first mapping table, the first tunnel interface identifier corresponding to the first single-homing user device.

18. The first network device according to claim 16, wherein the first network device and each of the at least two network devices support a virtual extensible local area network (VXLAN) function; and to send, according to a first tunnel interface identifier, the first data packet comprising the first data to the second network, the instructions further cause the processor to:
generate, the first data packet, wherein the first data packet comprises a VXLAN tunnel header, and an outer destination address field of the VXLAN tunnel header comprises the first tunnel interface identifier; and
send, the first data packet to the second network device through a VXLAN tunnel corresponding to the first tunnel interface identifier.

19. The first network device according to claim 17, wherein the first mapping table indicates a mapping relationship between an identifier of each of a plurality of single-homing user devices and a tunnel interface identifier corresponding to the single-homing user device; and to determine, based on the first mapping table, the first tunnel interface identifier corresponding to the first single-homing user device, the instructions further cause the processor to:
determine, based on the first mapping table, a tunnel interface identifier corresponding to a first device identifier as the first tunnel interface identifier, wherein the first device identifier is used to indicate the first single-homing user device.

20. The first network device according to claim 19, wherein the first data is data carried in a second data packet received by the first network device, and the second data packet comprises the first device identifier.

21. The first network device according to claim 16, wherein at least one multi-homing tunnel interface is configured for the multi-homing user device, and the at least one multi-homing tunnel interface is configured with a tunnel interface identifier different than the first tunnel interface identifier.

* * * * *

UNITED STATES PATENT AND TRADEMARK OFFICE
CERTIFICATE OF CORRECTION

PATENT NO. : 12,034,568 B2  
APPLICATION NO. : 17/980631  
DATED : July 9, 2024  
INVENTOR(S) : Jiuyong Li Page 1 of 1

It is certified that error appears in the above-identified patent and that said Letters Patent is hereby corrected as shown below:

In the Specification

In Column 1, Lines 8-9, delete "2020. This application" and insert -- 2020, which --.

In the Claims

In Column 26, Line 39, in Claim 11, after "packet" delete "comprising first data".

Signed and Sealed this
Second Day of September, 2025

Coke Morgan Stewart
*Acting Director of the United States Patent and Trademark Office*